United States Patent Office 3,274,592
Patented Sept. 20, 1966

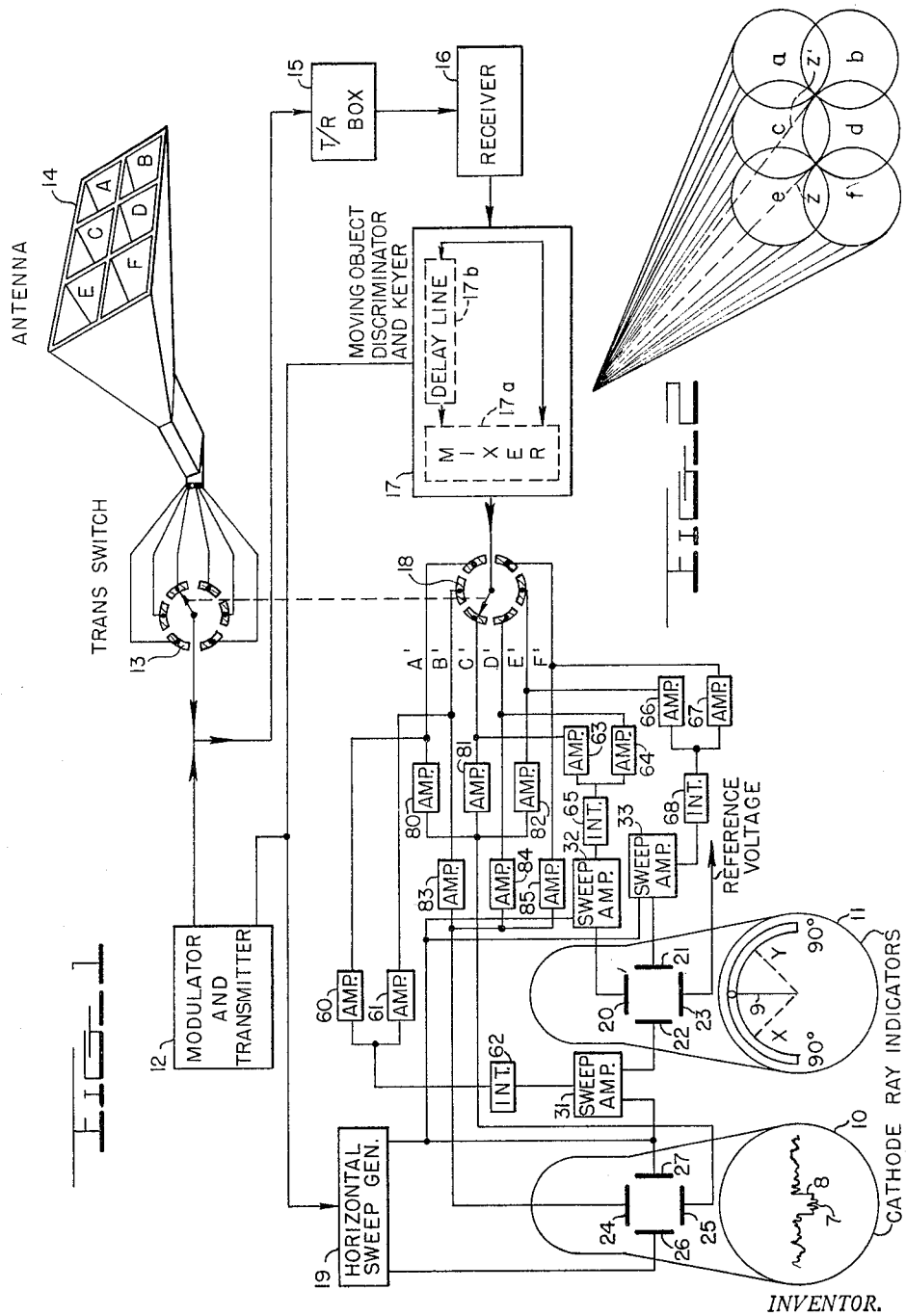

3,274,592
PULSE ECHO MOVING OBJECT
LOCATOR SYSTEM
Roger R. Crane, Washington, D.C. (% Massachusetts
Institute of Technology, Cambridge, Mass.)
Filed Oct. 7, 1948, Ser. No. 53,327
5 Claims. (Cl. 343—11)

The invention described herein may be manufactured and used by or for the Government of the United States of America for governmental purposes without the payment of any royalties thereon or therefor.

This invention relates in general to a moving object locator system and in particular to pulse echo method and means of determining azimuth, elevation and range of a moving target.

In general the present invention provides a novel moving object locator system which comprises a pulse transmitter and an antenna array with a plurality of feeds arranged to provide a plurality of overlapping divergent zones of radiation and reception. In the preferred embodiment, the several zones of radiation and reception are organized to produce a pair of coplanar divergent equal signal intensity axes for use in determining the bearing and elevation of the object. As indicated, these axes lie in a common plane, and as more fully detailed hereinafter, permit wide angle operation of the system without lessening the overall sensitivity or angle resolving accuracy of the system.

Associated with the pulse transmitter and antenna array is a switching circuit operative to permit the radiation of transmitter pulses and the reception of echoes produced thereby, to be performed on only one antenna feed at a time and to sequentially switch succedent transmitter pulses to distinct antenna feeds in rotative order as more fully described hereinafter.

In accordance with another feature of the invention a moving object discriminator circuit is utilized to cancel out echoes obtained from stationary objects whereby only those echoes obtained from moving objects are indicated. This discriminatory action is accomplished in such a manner that an echo obtained from a stationary object lying in any particular zone of reception is cancelled out by the next succeeding echo obtained therefrom. Thusly only those echoes obtained from moving objects will pass through the moving object discriminator circuit. These echoes are then fed through a receiver switch which is synchronized with the transmitter switch to place the echo from the moving object in a pulse channel corresponding to the particular radiation zone from which it was received. The outputs from the several echo channels are then employed to deflect the electron beams of a pair of cathode ray tube indicators. The first indicator is used to indicate range and elevation of the moving target. The second is used to indicate target bearing.

Accordingly an object of this invention is to provide a new and improved pulse echo moving object locator system.

A further object is to provide a pulse echo system for simultaneously detecting a moving object and for determining its bearing, elevation and range.

Another object of this invention is to provide a new and improved moving object locator system utilizing a plurality of divergent overlapping zones of radiation and reception.

Another object of this invention is to provide suitable indicating mechanisms for use in the present invention.

Further objects and attainments will become apparent upon a careful consideration of the following detailed description when read in conjunction with the drawing, in which FIG. 1 is a schematic diagram partly in block illustrating one typical embodiment of the invention and FIG. 2 is a perspective diagram of the antenna radiation and reception patterns.

Referring now, in particular to the drawing there is illustrated the teaching of the invention, as applied to a pulse echo moving object locating system, comprising a transmitter 12 for periodically transmitting short duration radio frequency pulses, a transmitter switch 13 for sequentially switching the pulses one at a time to a plurality of antenna feeds A, B, C and so on, a receiver 16 for receiving the pulse echoes, a moving object discriminator circuit 17 for cancelling those echoes originating from stationary objects, a receiving switch 18 and finally a pair of cathode ray indicators 10 and 11.

The antenna array 14 may consist, for the sake of illustration, of six feeds A, B, C, D, E and F operative to provide six overlapping divergent zones of radiation and reception $a$, $b$, $c$, $d$, $e$ and $f$ as shown in FIG. 2. Each feed corresponding to an individual divergent zone of radiation and reception. The six zones are disposed, in the present invention, to have three azimuthally disposed upper zones, $a$, $c$ and $e$ immediately superimposed over three lower zones, $b$, $d$ and $f$. The upper and lower zones also overlap to yield two effective equal power axes Z and Z' for the six zones of radiation and reception.

In the preferred embodiment an antenna array consisting of six feeds yielding two equal power axes is employed rather than the conventional two antennas that yield one equal power point. Six zones of radiation and reception are used for several purposes, one of which is to maintain high sensitivity in the individual zones of reception and to simultaneously increase the effective angle of operation. This is an important advantage in the detection of the movements of very small objects, such as mortar shells for example, where the duration of flight covers very short periods. Any attempt to increase the angle of the antenna pattern by enlarging the individual zones reduces proportionally the sensitivity of the system.

By employing six zones of reception as illustrated in the drawing the effective angle of the aggregate antenna pattern is increased principally in the horizontal plane and the sensitivity is maintained in each individual zone of reception from which the object may first be detected. For similar reasons in respect to radiation the power ratio versus area is maintained whereas the overall effective area of coverage is increased. The six feed antenna array in the preferred embodiment is so mounted that it may be rotated to scan its radiation and reception patterns both horizontally and vertically. The apparatus for so rotating the antenna is omitted since it forms no part of the invention.

Both the modulator and transmitter 12 may be of any suitable conventional design with the operation of the transmitter 12 being synchronized with the action of the moving object discriminator circuit 17, by a keyer incorporated therein. The keyer generates a recurrent modulator trigger pulse, which in turn operates to produce a similar recurrent high frequency pulse at the output of the transmitter 12. Each pulse from the transmitter 12 is fed to the rotor of the transmitter channelizing switch illustrated as 13. For purposes of illustration, switches 13 and 18 have been shown as being mechanical in nature. In practice, however, an electronic switch of well known design may be preferred.

In the transmitting condition the first pulse from transmitter 12 is switched by transmitter switch 13, to feed A of the antenna 14, which produces the upper left hand zone of radiation $a$; the second pulse is switched to feed B thereby producing the lower left hand zone of radiation $b$; the third pulse is switched to feed C thereby producing the upper center zone of radiation $c$; the fourth pulse is switched to feed D thereby producing the lower center zone of radiation $d$; the fifth pulse is switched to feed E thereby producing the upper right hand zone of radiation *e*; the sixth pulse is switched to feed F, thereby producing the lower right hand zone of radiation *f*. Pulse seven is switched back to feed A and the cycle is thereafter repeated. In the receiving condition, switch 13 is operative to effect reception only on that antenna feed A, B, C, D, E or F, which was used in transmission. More particularly, feed A is used to receive echoes resulting from pulses transmitted from the same feed; feed B is used to receive echoes resulting from pulses transmitted from feed B and so on. Accordingly, as an example, if the transmitter pulse repetition frequency is 6000 pulses per second and there are six switch positions the effective pulses per antenna feed position is 1000 pulses per second.

As previously mentioned the returning echoes are received by the same six feed antenna, employed for radiating the pulses. This is accomplished by the use of a T/R Box 15 which functions to isolate the receiver 16 from the transmitter 12 during periods of transmitter operation. The response of receiver 16 should be reasonably linear, but may be of a conventional design with standard characteristics. After the reflected energy from the radiated pulses is received it is detected and amplified by the receiver 16 and fed to moving object discriminator 17. For a complete description of moving object discriminator circuits such as that employed in the present invention reference is made to "Radar System Engineering," 1947 edition by Louis N. Ridenour, pages 626–679, a McGraw-Hill publication.

Moving object discriminator 17 is necessary to cancel responses from stationary objects, and thereby to permit only those echoes received from moving objects to be recorded on the cathode ray indicators 10 and 11. Without such discriminatory action any object detected would normally give an indication, rendering it difficult to differentiate between desired moving objects and undesired stationary objects. A response from moving objects with the ground clutter removed enables the present system to be applicable in the detection of very small objects such as previously referred to, a mortar shell, or the detection of aircraft with signals such as arise from a heavy storm removed. The echoes arising from stationary objects, those objects not desired to be detected are cancelled out through the aforementioned moving object discriminator 17.

Undesired echoes from stationary objects are cancelled by feeding part of the received energy from each pulse, in the output of the receiver 16, both directly to a mixer circuit 17a, and indirectly through a delay line 17b to the mixer 17a. The part of the received energy that passes through the delay line is delayed one complete switching cycle of the transmitter switch 13. Thusly the received energy from pulse 1 is delayed the time it requires the transmitter 12 to transmit 6 pulses. The received energy of pulse 7 that passes directly to the mixer is then phase compared with the delayed energy of pulse 1. The received energy from delayed pulse 1 and undelayed pulse (assuming they are from stationary objects) display constant amplitude and phase and thereby when compared cancel, and allow only the energy from moving objects, that is energy that isn't comparable in phase for succeeding pulses, to pass through the delay circuit. This procedure then is repeated in connection with the echo energy received from each of the antenna feeds.

The removal of the energy received from stationary objects is further aided by the use of a single receiver feeding the energy to the moving object discriminator. Exact comparison of equal signals may be had, and which probably would not be obtained if more than one receiver were used, as the characteristics of two or more receivers would more than likely vary.

The resulting energy from the moving object discriminator 17, that is when an echo is received from a moving object, is fed to a receiver switch 18, which is synchronized with the transmitter switch 13. Receiver switch 18 places the received energy into 6 pulse channels corresponding to the six feed poistions of the antenna array 14 from which the signal was received. The receiver switch operates to switch the echo energy received from pulse 1 into channel A', that received from pulse 2 into channel B', pulse 3 into channel C', pulse 4 into channel D', pulse 5 into channel E', pulse 6 into channel F', and pulse 7 back to channel A' and the cycle thereafter repeats.

As a means of visually indicating the azimuth of the object, to apprise the operator of the fact that he has detected a moving target and to afford him with the necessary information in tracking the object in its course of flight, the preferred embodiment of the present invention utilizes cathode ray indicator 11. Channels A' and B' corresponding to the upper left hand zone of reception *a*, and lower left hand zone of reception *b* respectively, are coupled through buffer amplifiers 60 and 61 to an integrator 62 and thence to sweep amplifier 31 and then to the left hand horizontal deflecting plate 22 of the cathode ray indicator 11; channels C' and D' corresponding to the upper center and the lower center zones of reception *c* and *d* respectively, are coupled through buffer amplifiers 63, 64 and integrator 65 to sweep amplifier 32 and then to the upper vertical deflecting plate 20, and channels E' and F' corresponding to the upper and lower right hand zones of reception *e* and *f* are coupled through buffer amplifiers 66 and 67 and integrator 68 to sweep amplifier 33 and then to the right hand horizontal deflecting plate 21.

The cathode ray tube indicator 11, as employed with this specific embodiment, is of a conventional design, but only 3 deflecting plates are utilized with the 4th deflecting plate 23 coupled to a reference voltage for centering electron beam. Sweep generator 19 and sweep amplifiers 31, 32 and 33 are also conventional in design. Amplifiers 31, 32 and 33 are of the variable gain type. Sweep generator 19 supplies the deflection voltage for plates 20, 21 and 22 through sweep amplifiers 31, 32 and 33. The integrator circuits are used for comparison of signals of different time occurrence, and are operable in a conventional manner to produce a direct current control voltage responsive to the received pulses for controlling the amplitude of the sweep voltage developed at the output of amplifiers 31, 32 and 33.

The cathode ray indicator 11 performs the specific function of visually indicating the azimuth of the moving target that is detected. This is done by matching the returned power in the three azimuthal sectors of reception with each sector corresponding to upper and lower zones of reception. The radius sweep arm 9 of the cathode ray indicator 11 rotates in an arc about a center axis in proportion to the amplitude of the sweep voltage on the deflecting plates, that is, the radius sweep arm 9 indicates the vector sum of the power on the plates, and rotates in an arc of 180° of the face of the cathode ray indicator 11. The amplitude of the sweep voltage is directly dependent upon the amount of direct current control voltage applied to the amplifiers 31, 32 and 33 from the integrator circuits. In actual operation of the system the sweep circuit amplifiers are biased to cutoff and rendered conductive only upon the reception of the integrated voltage.

As an example of the operation of cathode ray indicator 11 to indicate the particular zone of reception upon which a moving object is detected assume, for purposes of illustration, that an object is detected in a right hand zone *a* or *b*. There will thusly appear through the discriminator circuit 17 a voltage in pulse channel A' or B' and when integrated in integrator 62, will render sweep amplifier 31 operative. Sweep amplifier 31 being connected to deflecting plate 22, will in turn deflect the radial sweep arm 9 of cathode ray indicator 11 to the extreme left. If an object is detected in one of the center zones *c* or *d* there will thusly appear a voltage in pulse channel C' or D' and when integrated in integrator 65 will render sweep amplifier 32 operative. Sweep amplifier 32 being connected to deflecting plate 20 will maintain the radial sweep arm 9 at its normal center positon. In a similar manner, if an object is detected in left hand zone e or f there will thusly appear a voltage in pulse channel E' or F' and when integrated in integrator 68 will render sweep amplifier 33 operative. Sweep amplifier 33 being connected to deflecting plate 21 will in turn deflect the radial sweep arm 9 to the extreme right.

It is seen then that if an object is detected at the equal power axis Z' there will appear a voltage in pulse channels A', B', C' and D' and when integrated in integrators 62 and 65, respectively, will render both sweep amplifiers 31 and 32 operative. The radial sweep arm 9 will consequently indicate the vector sum of the two powers, which indication will be half way between top center and the extreme left as shown by dotted line X. If an object is detected at the equal power axis Z, there will appear a voltage in C', D', E' and F' and when integrated in integrators 65 and 68 respectively will render both sweep amplifiers 32 and 33 operative. The radial sweep arm 9 will consequently indicate the vector sum of the two powers which indication will be half way between top center and the extreme right, as shown by dotted line Y.

As a convenient means for an operator to track the object through its course of flight upon one of the equal power axes there may be incorporated over the screen of cathode ray tube indicator 11 a fiducial line etched on the cathode ray indicator such as shown at X or Y. An alternative means of indicating the position of an object would be to calibrate the screen in degrees.

The degree of area of coverage of the antenna array may be adjusted according to the particular needs. The preferred embodiment, for example, covers an angle of 30°, therefore since the arc of the radius sweep arm is 180° a ratio of 6 to 1 is obtained in presenting a finer reading of the azimuth of the moving target.

In order to render the information useful, a means for tracking the moving target may be employed in the system, but is not illustrated in FIG. 1 since the mechanical tracking means forms no part of the invention. Tracking of the antenna to follow the target through its course of flight could be either by hand crank or automatic, and the target's course of flight is tracked, in the preferred embodiment, when the sweep arm 9 is centered on X or Y representative of the two equal power axes of the overlapping zones of reception.

As the cathode ray indicator 11 indicates azimuth only and in order to indicate elevation and range, cathode ray tube indicator 10 is utilized. The combined energy received by the upper three zones of receptivity a, c and e, is applied through three separate buffer amplifiers 80, 81 and 82 to the vertical deflecting plate 25. In a similar manner the combined energy received from the lower three zones, b, d and f is applied through the separate buffer amplifiers 83, 84 and 85 to the vertical deflecting plate 24. A range sweep, generated synchronously with the operations of the transmitter, is supplied by a conventional sweep generator 19 to the horizontal deflecting plates 26 and 27.

A typical procedure may now be described in accordance with the present invention for detecting a moving object and for determining its azimuth, range and elevation. When a moving object appears in the area of that covered by the six zones of reception, an indication will appear on the cathode ray tube indicator 10. This indication is in the form of an envelope with its magnitude being large at first as the moving target passes through the center of a zone of reception. The magnitude of the envelope diminishes until the envelope balances as the moving object passes through one of two equal power axes Z or Z', of the six overlapping divergent zones of reception. An operator of the system then matches the magnitude of the upper and lower halves of the envelope 7 on cathode ray indicator 10 thus causing the antenna to mechanically follow the elevation variation of the moving object. The operator then sets the radius arm sweep 9 on one of the two center points x or y of cathode ray indicator 11 and which points correspond to the two equal power axes Z and Z' of the overlapping zones of reception thus causing the antenna to mechanically follow the azimuth variation of the moving object.

Although I have shown and described only certain and specific embodiments of the present invention, it must be understood that many modifications are possible thereof without departing from the true spirit of the disclosure.

What is claimed is:

1. A pulse echo moving object locator system comprising a directive antenna array including a plurality of feeds operative to provide a plurality of overlapping zones of radiation and reception so disposed to produce at least a pair of equal signal intensity axes, a radio pulse transmitter and receiver, said transmitter being operative to periodically emit radio frequency pulses, switching means for sequentially connecting said transmitter and receiver to said feeds in such manner as to permit the radiation of one pulse and the reception of echoes therefrom from one antenna feed at a time in sequence, a moving object discriminator circuit means operative to cancel echoes obtained from stationary objects lying in any particular zone of reception fed by the output of said receiver, and means operatively connected to said moving object discriminator circuit for indicating the reception of energy reflected from moving objects.

2. A pulse echo moving object locator system comprising a directive antenna array including a plurality of feeds operative to provide a plurality of overlapping zones of radiation and reception so disposed to produce at least a pair of equal signal intensity axes, a radio pulse transmitter and receiver, said transmitter being operative to periodically emit radio frequency pulses, switching means for sequentially connecting said transmitter and receiver to said feeds in such manner as to permit the radiation of one pulse and the reception of the echoes therefrom from one antenna feed at a time in sequence, a moving object discriminator circuit means operative to cancel echoes obtained from stationary objects lying in any particular zone of reception fed by the output of said receiver, a cathode ray tube indicator means including symmetrically arranged deflecting elements and means for sweeping the electron beam of said cathode ray tube indicator, circuit means operatively connecting said moving object discriminator circuit means to the deflecting elements of said cathode ray tube indicator means for indicating the reception of energy reflected from moving objects.

3. A pulse echo moving object locator system comprising a directive antenna array including a plurality of feeds operative to provide a plurality of overlapping zones of radiation and reception so disposed to produce at least a pair of equal signal intensity axes, a radio pulse transmitter and a radio pulse receiver, said transmitter being operative to periodically emit radio frequency pulses, first switching means for sequentially connecting said transmitter and said receiver to said feeds in such a manner as to permit the radiation of one pulse and the reception of echoes therefrom from one antenna feed at a time in sequence, a moving object discriminator circuit means operative to cancel echoes obtained from stationary objects lying in any particular zone of reception fed by the output of said receiver, a cathode ray tube indicator means including symmetrically arranged deflecting elements and means for sweeping the electron beam of said cathode ray tube, a plurality of pulse channels each corresponding to one of said zones of reception, and second switching means operating in synchronism with said first switching means connected to said moving object discriminator circuit means to switch the reflected energy from moving objects to said pulse channels in accordance with the zone of reception from which the energy is reflected, circuit means connecting said pulse channels to the deflecting elements of said cathode ray tube indicator means for indicating the particular zone of reception of said reflected energy from moving objects.

4. A pulse echo moving object locator system comprising a directive antenna array including a plurality of feeds operative to provide a plurality of overlapping zones of radiation and reception so disposed to produce at least a pair of equal signal intensity axes, a radio pulse transmitter and a radio pulse receiver, said transmitter being operative to periodically emit radio frequency pulses, first switching means for sequentially connecting said transmitter and said receiver to said feeds in such a manner as to permit the radiation of one pulse and the reception of echoes therefrom from one antenna feed at a time in sequence, a moving object discriminator circuit means operative to cancel echoes obtained from stationary objects lying in any particular zone of reception fed by the output of said receiver, cathode ray tube indicator means including symmetrically arranged deflecting elements and means for radially sweeping the electron beam of said cathode ray tube indicator, a plurality of pulse channels each corresponding to one of said zones of reception, second switching means operating in synchronism with said first switching means connected to said moving object discriminator circuit means to switch the reflected energy from moving objects to said pulse channels in accordance with the zone of reception from which the energy is reflected, circuit means connecting said pulse channels to the deflecting elements of said cathode ray tube indicator means for deflecting the electron beam along a radius in accordance with the amplitude of the received energy from moving objects to thereby indicate the particular zone of reception from which the moving object is detected.

5. A pulse echo moving object locator system comprising a directive antenna array, six feeds associated thereto operative to provide three pairs of feeds each providing a different pair of upper and lower overlapping divergent zones of radiation and reception so disposed to produce at least two equal signal intensity axes, a radio pulse transmitter and a radio pulse receiver, said transmitter being operative to periodically emit radio frequency pulses, first switching means for sequentially connecting said transmitter and said receiver to said feeds in such a manner as to permit the radiation of one pulse and the reception of echoes therefrom from one antenna feed at a time in sequence, a moving object discriminator circuit means operative to cancel echoes obtained from stationary objects lying in a particular zone of reception fed by the output of said receiver, a cathode ray tube indicator means including symmetrically arranged deflecting elements and means for radially sweeping the electron beam of said cathode ray tube, a plurality of pairs of pulse channels each corresponding to one pair of said zones of reception, second switching means operating in synchronism with said first switching means connected to said moving object discriminator circuit means to switch the reflected energy from moving objects to said pulse channels in accordance with the zone of reception from which the energy is reflected, circuit means connecting each pair of said pulse channels to a different deflecting element for deflecting the said radial sweep in a left or right direction from a common point in accordance with the amplitude of said reflected echoes appearing in the zones of reception to thereby indicate the particular zone of reception from which the object was detected.

References Cited by the Examiner

UNITED STATES PATENTS

| | | | |
|---|---|---|---|
| 2,405,930 | 8/1946 | Goldberg et al. | 343—16 |
| 2,406,316 | 8/1946 | Blumlein et al. | 343—8 X |
| 2,412,702 | 12/1946 | Wolff | 343—11 |
| 2,415,566 | 2/1947 | Rhea | 343—16 |
| 2,422,135 | 6/1947 | Sanders. | |
| 2,422,334 | 6/1947 | Bedford | 343—16 X |
| 2,422,361 | 6/1947 | Miller | 343—16 |
| 2,423,519 | 7/1947 | Rhea et al. | 343—16 |
| 2,423,661 | 7/1947 | Rhea | 343—16 |
| 2,437,173 | 3/1948 | Rutherford. | |
| 2,449,976 | 9/1948 | Busignies | 343—16 X |
| 2,480,038 | 8/1949 | Mason | 343—9.5 |
| 2,480,829 | 9/1949 | Barrow et al. | 343—11 X |
| 2,523,283 | 9/1950 | Dickson | 343—9.5 |

CHESTER L. JUSTUS, *Primary Examiner.*

MELVIN H. FRIEDMAN, SIMON YAFFEE,
*Examiners.*

F. M. STRADER, N. H. SHAPIRO, A. S. TENSOR,
P. M. HINDERSTEIN, *Assistant Examiners.*